United States Patent [19]

Matsuki et al.

[11] Patent Number: 5,568,844
[45] Date of Patent: Oct. 29, 1996

[54] BRAKING APPARATUS OPERATED VIA RESILIENT DEFORMATION OF CONED DISK SPRINGS

[75] Inventors: Yuji Matsuki, Sayama; Seiji Hirohashi, Tokyo, both of Japan

[73] Assignee: Kabushiki Kaisha SG, Japan

[21] Appl. No.: 179,269

[22] Filed: Jan. 10, 1994

[30] Foreign Application Priority Data

Jan. 11, 1993 [JP] Japan .................................. 5-017889

[51] Int. Cl.$^6$ ................................................. F16D 63/00
[52] U.S. Cl. ................................................. 188/68; 188/69
[58] Field of Search .............................. 188/67, 166, 167, 188/170; 248/161, 411; 74/531; 267/159

[56] References Cited

U.S. PATENT DOCUMENTS

| 3,828,893 | 8/1974 | Clark | 188/67 |
|---|---|---|---|
| 4,564,088 | 1/1986 | Takahashi et al. | 188/67 |
| 4,699,042 | 10/1987 | Stoll | 188/67 |

FOREIGN PATENT DOCUMENTS

| 1207766 | 4/1960 | France | 188/67 |
|---|---|---|---|
| 1-38354 | 11/1989 | Japan . | |

Primary Examiner—Robert J. Oberleitner
Assistant Examiner—Chris Schwartz
Attorney, Agent, or Firm—Graham & James LLP

[57] ABSTRACT

A braking apparatus performs its braking action by pressing a brake bush radially inwardly against a rod. The brake bush is pressed via a plurality of coned disk springs, each of which has a plurality of outer and inner radial recesses extending from its outer and inner peripheral edges, respectively. The outer and inner recesses are arranged in an alternating fashion along the circumference of the spring. As a brake piston moves in the axial direction of the rod, the inner peripheral edge of each of the springs is compressed or deformed radially inwardly. The brake piston is moved by compressed air supplied from outside. By increasing the radial length of each of the inner radial recesses of the coned disk springs in such a manner that the radial outward end of the recess is located far beyond the radial inward end of each adjacent outer radial recess, it is permitted to provide at least three or more coned disk springs around the brake bush. Thus, abrasion of each coned disk spring can be minimized, and durability of the braking apparatus can be greatly enhanced. Further, by forming each of the coned disk springs so as to have a rectangular sectional shape, it is possible for the braking apparatus to perform a sufficient braking function even when the outer and inner peripheral edges of the coned disk springs have been abraded to a considerable degree.

3 Claims, 4 Drawing Sheets

BRAKING APPARATUS OPERATED VIA RESILIENT DEFORMATION OF CONED DISK SPRINGS

BACKGROUND OF THE INVENTION

The present invention relates to a braking apparatus which works to prevent or restrain a relative movement between a rod and a given object that moves relative to the rod axially along the outer surface of the rod.

Pneumatic cylinders utilizing compressed air are known which comprise a braking apparatus that works to apply a braking force to a rod moving relative to a cylinder block so as to accurately position the rod at a desired position. Such a braking apparatus is disclosed in, for example, Japanese Utility Model Laid-open Publication No. SHO 59-13731 and Japanese Utility Model Publication No. HEI 1-38354.

FIG. 4 shows, by way of example, the general structure of the braking apparatus disclosed in the above-mentioned publications. The braking apparatus is composed of a full pneumatic brake mechanism, where compressed air is allowed to act within the apparatus in response to ON/OFF control of an electromagnetic valve, so as to control activation/deactivation of the braking function. General description on the braking apparatus will be given below with reference to FIG. 4.

The entire braking apparatus is cover ed with a cylindrical casing 61, through which a rod 22 extends within the braking apparatus. The casing 61 is mechanically secured to a movable object (such as a cylinder block in the case of a pneumatic cylinder) that is movable relative to the rod 22. Bearings 24L, 24R are provided at opposite ends of the casing 61 in such a manner that they are slidable on and along the rod 22 in the axial direction thereof. Packing members 62a, 62b and 63a, 63b are provided between the bearings 24L, 24R and the rod 22, so as to assure airtightness within the casing 61.

The casing 61 has first piping for supplying pressurized or compressed air from an unillustrated air pressure source to an air chamber 68 within the casing 61 via a pipe C4 and an electromagnetic valve 65, and second piping for supplying the compressed air from the air pressure source to air chambers 67L, 67R. In FIG. 4, the electromagnetic valve 65 is shown as being in the OFF state, so that the air chamber 68 is allowed to receive the compressed air supplied from the air pressure source via the valve 65 and first piping and the air chambers 67L, 67R are exposed to the external atmospheric pressure.

Brake pistons 69L, 69R are in contact with the casing 61 via packing members 71a, 70a and also in contact with the rod 22 via packing members 7b, 71b, in such a manner that the pistons 69L, 69R are slidable on and along the rod 22 in the axial direction thereof. The air chamber 67L is defined between the brake piston 69L and the casing 61, the air chamber 67R is defined between the brake piston 69R and the casing 61, and the air chamber 68 is defined between the brake piston 69L and the brake piston 69R.

In the air chamber 68 defined between the brake pistons 69L, 69R, a spacer member 68a is provided for reducing the volume of the chamber 68 to hold coil springs 72 within the chamber 68. The spacer member 68a is generally in the form of a circular plate whose outer peripheral portion is mechanically secured to the casing 61. The spacer member 68a has a central opening for passing therethrough the rod 22, and peripheral openings for holding coil springs 72 around the outer periphery of the central opening. The peripheral, i.e., spring holding openings are spaced from each other around the periphery of the rod 22 at angular intervals of 120 degrees, and they form a part of the first piping for supplying the compressed air to the air chamber 68.

The coil springs 72 are disposed in the respective spring holding openings for resiliently pressing the brake pistons 69L, 69R apart from each other along the axis of the rod 22.

Brake bushes 74L, 74R are also provided to surround the rod 22. As shown in FIGS. 5A to 5C, each of the brake bushes 74L, 74R is in the form of a cylinder which has a slit 51 defined along the full axial length thereof and other slits 52, 53, 54 each defined along a part of the axial length thereof. The inner peripheral surface of each of the brake bushes 74L, 74R is in contact with the outer peripheral surface of the rod 22. In addition, the inner peripheral surface of each of the brake bushes 74L, 74R is threaded, so that, when an external force is applied to the bushes 74L, 74R to radially press the rod 22, the inner peripheral surface in contact with the rod 22 causes a great frictional braking force. However, when the brake bushes 74L, 74R are in the normal state where no external force is applied thereto, the bushes 74L, 74R are only caused to slide along the outer peripheral surface of the rod 22.

Coned disk spring sections 73L, 73R are provided around the outer peripheral surfaces of the brake bushes 74L, 74R which include the slits 51 to 54. Each of the coned disk spring sections 73L, 73R comprises two coned disk springs 73, only one of which is shown in FIGS. 6A and 6B since they are identical in configuration. As clearly shown in FIGS. 6A and 6B, each of the coned disk springs 73 has a plurality of outer radial recesses 73a extending from the outer peripheral edge thereof and spaced apart from each other at equal angular intervals, and also a plurality of inner radial recesses 73B extending from the inner peripheral edge thereof and spaced apart from each other at equal angular intervals. The outer and inner radial recesses are arranged in an alternating fashion along the circumference of the coned disk spring 73. Further, in a sectional view taken along line A1–A2, each of the coned disk springs 73 has a bottomless-dish-like shape.

When the coned disk springs of the spring sections 73L, 73R are not pressed by the brake pistons 69L, 69R, the inner peripheral surfaces of the coned disk springs are held in close contact with the outer peripheral surfaces of the corresponding brake bushes 74L, 74R without leaving any gap and similarly the outer peripheral surfaces of the coned disk springs are held in close contact with the inner peripheral surfaces of the corresponding brake pistons 69L, 69R without leaving any gap, as shown in FIG. 7A. When the coned disk springs of the spring sections 73L, 73R are pressed by the brake pistons 69L, 69R, the springs are deformed in such a manner that the inner diameter D1 of each of the coned disk springs is caused to become smaller. Thus, a force is applied to radially inwardly press the brake bushes 74L, 74R with the slits 51–54 of the bushes 74L, 74R considerably reduced in width. Because of this, the inner diameters of the brake bushes 74L, 74R are caused to become smaller so that the threaded inner peripheral surfaces of the bushes 74L, 74R are brought into biting engagement with the rod 22, with the result that the braking apparatus is brought into the braking (active) state.

As soon the brake pistons 69L, 69R stop pressing the spring sections 73L, 73R, each of the coned disk springs resiliently reverts to its original shape so that the pressing force from the spring sections is no longer applied to the brake bushes 74L, 74R. This causes the inner peripheral surfaces of the brake bushes 74L, 74R to separate from the rod 22, with the result that the braking apparatus is brought into the non-braking (inactive) state.

When the unillustrated air pressure source is in the OFF state, the braking apparatus is always maintained in the braking state through the resilient force of the coil springs 72. Namely, unless the braking apparatus is supplied with compressed air from the air pressure source, it can be maintained in the braking state (i.e., self-locking state).

When the air pressure source is in the turned-ON state, the braking function of the braking apparatus can be activated or deactivated through the ON/OFF of the electromagnetic valve 65. When the electromagnetic valve 65 is in the OFF state as shown in FIG. 4, the compressed air is introduced from the air pressure source into the air chamber 68 while the air chambers 67L, 67R are both exposed to the external atmospheric pressure. Thus, the brake pistons 69L, 69R which are normally pushed away from each other by the coil springs 72 are even more strongly pushed apart from each other by additional high pressure of the compressed air. Accordingly, the coned disk spring sections 73L, 73R are pressed against the inner surface of the casing 61 in the axial direction of the rod 22, with a greater force than when the air pressure source is in the turned-OFF state. Due to this, a great frictional braking force is caused between the brake bushes 74L, 74R and the rod 22, and the braking state of the braking apparatus can be made stronger and more reliable.

On the other hand, when the electromagnetic valve 65 is in the ON state, the compressed air is introduced from the air pressure source into the air chambers 67L, 67R while the air chamber 68 is exposed to the external atmospheric pressure. Thus, high pressure of the introduced compressed air acts to reduce the resilient force of the coil springs 72, so that the brake pistons 69L, 69R are moved toward each other to compress the coil springs 72. This eliminates the pressing force applied to the spring sections 73L, 73R and thus each of the coned disk springs resiliently reverts to its original shape, so that the brake bushes 74L, 74R disengage the brake rod 22. As the result, the braking apparatus is brought into the non-braking state where the casing 61 is allowed to freely move along the rod 22.

The above-mentioned prior art braking apparatus is relatively superior in performance among various braking apparatus of the type where a braking force is applied to a rod, since it can provide a sufficiently great braking force and has good response characteristics.

But, the prior art braking apparatus mentioned above presents a problem that, as its braking action is performed repeatedly, for example, up to a million of times, considerable abrasion may occur in the outer and inner peripheral edges of the coned disk springs, thus deteriorating the braking capability of the apparatus.

Namely, before the braking action has not been performed many times, the coned disk spring engages with the corresponding brake piston and brake bush in a manner as shown in FIG. 7A. As the brake piston moves to the left as viewed in FIG. 1, the coned disk spring is deformed as shown in FIG. 7B to press the brake bush radially inwardly. This causes the brake bush to be pressed radially inwardly against the rod 22 with a pressing force $\Delta L1$ that equals L1 (sin $\theta b$–sin $\theta a$). Namely, this pressing force L1 corresponds to the length of a diagonal line L1 in the rectangular sectional shape of the coned disk spring and to the angles $\theta a$, $\theta b$ defined between the diagonal line L1 and the outer surface of the brake bush.

However, as the braking action is performed repeatedly, for example, up to a million of times, considerable abrasion may occur in the outer and inner peripheral edges of the coned disk springs so that the length of the diagonal line becomes smaller as shown by L2 in FIG. 7C. Because of this, the diagonal line L2, even when the braking apparatus is not in the braking state, formes an angle $\theta c$ that is greater than the angle $\theta a$ of FIG. 7A. Accordingly, even when the brake piston moves to the left so that the angle $\theta b$ is reached as shown in FIG. 7D, the brake bush is pressed against the rod 22 only with a pressing force $A\Delta L2$ (=(sin $\theta b$–sin $\theta c$) which is smaller than the above-mentioned force $\Delta L1$. As the result, the brake bush fails to contact the rod to a sufficient degree, and hence a sufficient braking force can not be provided by the braking apparatus.

SUMMARY OF THE INVENTION

It is therefore an object of the present invention to provide a braking apparatus which is capable of minimizing abrasion of coned disk spring employed, to thereby achieve increased durability of the braking apparatus.

It is another object of the present invention to provide a braking apparatus which is capable of providing a sufficient braking force even when the outer and inner peripheral edges of coned disk spring employed have been abraded to a considerable degree.

In order to achieve the first object of the invention, a braking apparatus in accordance with the present invention comprises a substantially columnar rod, a brake bush having a cylindrical shape and provided around the rod, the brake bush being capable of moving relative to the rod axially along an outer surface of the rod and also causing a frictional braking force between the brake bush and the rod by being pressed radially inwardly against the rod, coned disk springs each having a bottomless-dish-like shape and also having outer and inner radial recesses extending radially from outer and inner peripheral edges thereof, respectively, the outer and inner recesses being arranged in an alternating fashion along a circumference of the spring, the coned disk springs being provided in such a manner that the inner peripheral edge of each of the springs contacts an outer peripheral surface of the brake bush, a brake piston having an inner surface defining a cylindrical hole for providing therein the coned disk springs in such a manner that the outer peripheral edge of each of the spring contacts the inner peripheral surface of the brake piston, the brake piston being capable of moving relative to the rod axially along the outer surface of the rod to axially press the coned disk springs so that each of the springs is axially deformed into a flatter disk shape with the inner peripheral edge thereof compressed radially inwardly, to thereby press the brake bush radially inwardly against the rod, and a cylinder block capable of moving relative to the rod axially along the outer surface of the rod with the coned disk springs and brake piston held by the cylinder block and also allowing compressed air supplied from outside to act on the brake piston so that the brake piston is allowed to move axially along an inner surface of the cylinder block, characterized in that each of the inner radial recesses in each of the springs has an increased radial length so as to achieve a reduced axial spring constant without changing a wall thickness of the spring, and that at least three or more the coned disk springs are provided around the brake bush.

In order to achieve the second object of the invention, a braking apparatus in accordance with the present invention comprises a substantially columnar rod, a brake bush having a cylindrical shape and provided around the rod, the brake bush being capable of moving relative to the rod axially along an outer surface of the rod and also causing a frictional braking force between the brake bush and the rod by being pressed radially inwardly against the rod, coned disk springs each having a bottomless-dish-like shape and also having outer and inner radial recesses extending radially from outer and inner peripheral edges thereof, respectively, the outer and inner recesses being arranged in an alternating fashion along a circumference of the spring, the coned disk springs being provided in such a manner that the inner peripheral edge of each of the springs contacts an outer peripheral surface of the brake bush, a brake piston having an inner surface defining a cylindrical hole for providing therein the coned disk springs in such a manner that the outer peripheral edge of each of the spring contacts the inner peripheral surface of the brake piston, the brake piston being capable of moving relative to the rod axially along the outer surface of the rod to axially press the coned disk springs so that each of the springs is axially deformed into a flatter disk shape with the inner peripheral edge thereof compressed radially inwardly, to thereby press the brake bush radially inwardly against the rod, and a cylinder block capable of moving relative to the rod axially along the outer surface of the rod with the coned disk springs and brake piston held by the cylinder block and also allowing compressed air supplied from outside to act on the brake piston so that the brake piston is allowed to move axially along an inner surface of the cylinder block, characterized in that each of the coned disk springs has a rectangular sectional shape.

As previously mentioned, if the braking action is performed repeatedly up to about a million of times, the outer and inner peripheral edges of the coned disk spring would be abraded to a considerable degree, thus deteriorating the braking function of the apparatus. It can therefore be said that just by doubling the number of the coned disk springs employed, the braking apparatus will achieve doubled durability to be able to repeat the braking action up to about two rail lions of times. Namely, with the prior art braking apparatus of FIG. 4. it may be sufficient to increase the number of the coned disk springs from two to four.

However, in general, the spring constant will become greater in proportion to an increase in the number of the coned disk springs employed, and the following problem will arise. Namely, with the braking apparatus of FIG. 4, the brake piston is moved in the axial direction of the rod by pressure of compressed air so as to axially press the coned disk springs 73. So, if the total spring constant of the springs 73 is increased, pressing force sufficient for the braking action will not be provided to the coned disk springs 73 by the pressure of the compressed air alone. Therefore, in the past, it was not feasible to employ more than three coned disk springs.

On the other hand, in order to reduce the total spring constant of the coned disk springs, it may be sufficient to reduce the wall thickness of each individual coned disk springs. But, if the wall thickness is reduced, the springs may bend so easily that they can no longer apply a sufficient radial pressing force to the brake bush.

Through repeated experiments, the inventor of the present invention has finally succeeded in reducing the spring constant without the need for changing the wall thickness of the springs. To realize this, the braking apparatus for achieving the first object of the invention is characterized in that the inner radial recess of the coned disk spring has an increased radial length relative to that of the coned disk spring employed in the prior art braking apparatus (hereinafter referred to as a prior coned disk spring). With such a feature, at least three or more coned disk springs can be provided around the brake bush and thus abrasion of the springs can be minimized, thereby greatly enhancing durability of the braking apparatus.

Further, as shown in FIG. 6B, each prior coned disk spring 73 of the prior braking apparatus was machined in such a manner that its outer and inner peripheral surfaces are parallel with the axis of the rod 22, i.e., of the brake bush 74L or 74R and the brake piston 69L or 69R. Namely, each coned disk spring 73 was machined in such a manner that, in the non-braking state of the braking apparatus, its outer and inner peripheral edges are in close contact with the inner peripheral surface of the brake piston and the outer peripheral surface of the brake bush, respectively, without leaving any gap therebetween. So, from the beginning, each prior coned disk spring had a parallelogrammatic sectional shape, i.e., a shape of a coned disk spring having been partly abraded.

In view of this, the braking apparatus for achieving the second object of the invention is characterized in that the coned disk spring is formed so as to have a rectangular sectional shape. Through repetition of the braking action, such a coned disk spring will be gradually abraded and thus gradually turn from a rectangular sectional shape into a parallelogrammatic sectional shape that is equivalent to the sectional shape of the prior coned disk spring 73. After that, the coned disk spring of the invention will continue to be abraded in a similar manner as the prior coned disk spring 73. Thus, with the braking apparatus according to this invention, it is possible to enhance durability by such an amount corresponding to the number of times of the braking action performed before the coned disk spring of the rectangular sectional shape has been abraded to such a degree to exhibit the parallelogrammatic sectional shape. This enables the braking apparatus to always perform a sufficient braking function even when the outer and inner peripheral edges of the coned disk springs have been abraded to a considerable degree.

The two above-mentioned features may be used in combination. By so doing, durability of the braking apparatus can be enhanced even more greatly.

Now, the preferred embodiment of the present invention will be described in detail below with reference to the accompanying drawings.

DETAILED DESCRIPTION OF THE PREFERRED EMBODIMENT

Figure 1:
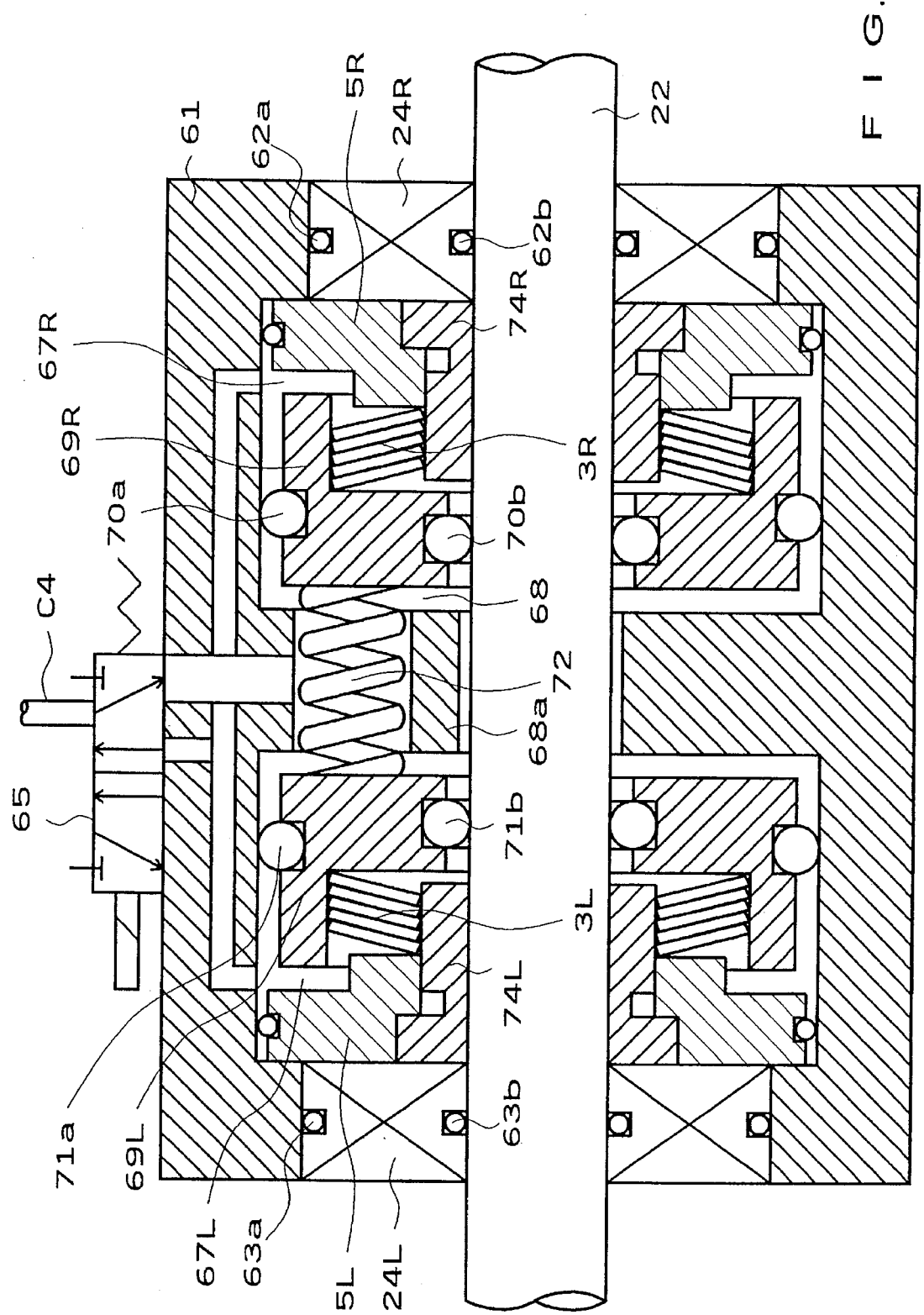
FIG. 1 is a sectional view showing the general structure of a braking apparatus in accordance with an embodiment of present invention.
Figures 2A, 2B:
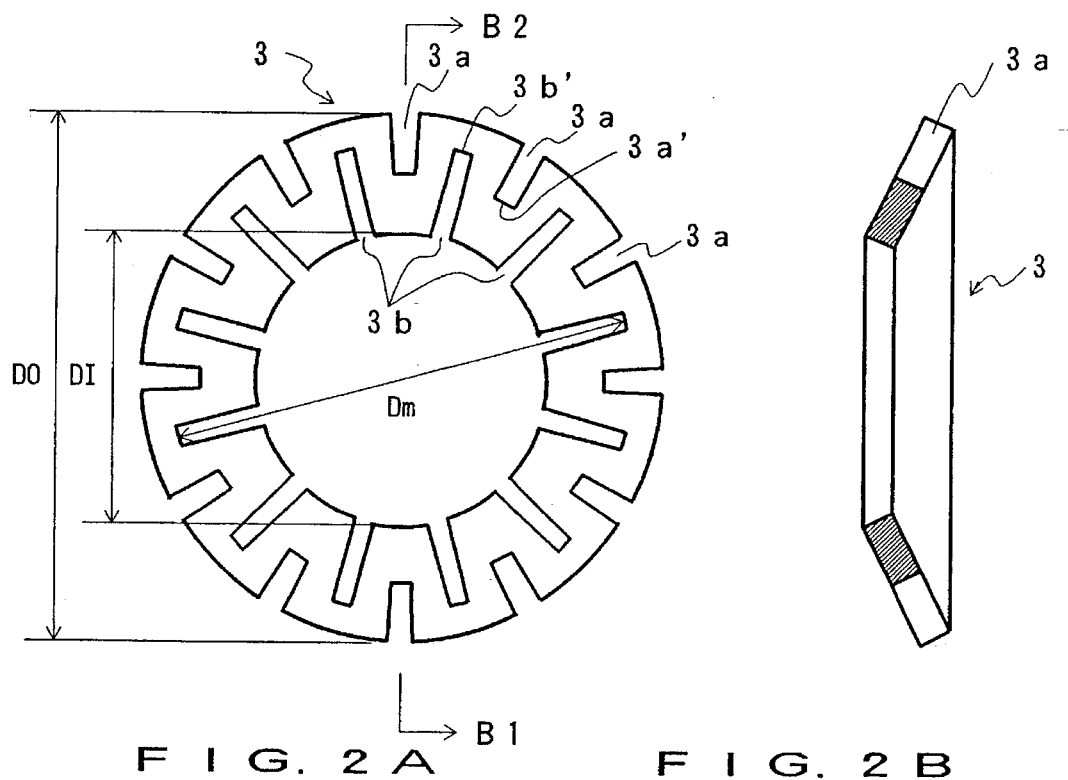
FIG. 2A is a top plan view showing the shape of a coned spring employed in the braking apparatus of the invention.
FIG. 2B is a sectional view taken along line B1–B2 of FIG. 2A.
Figure 4:
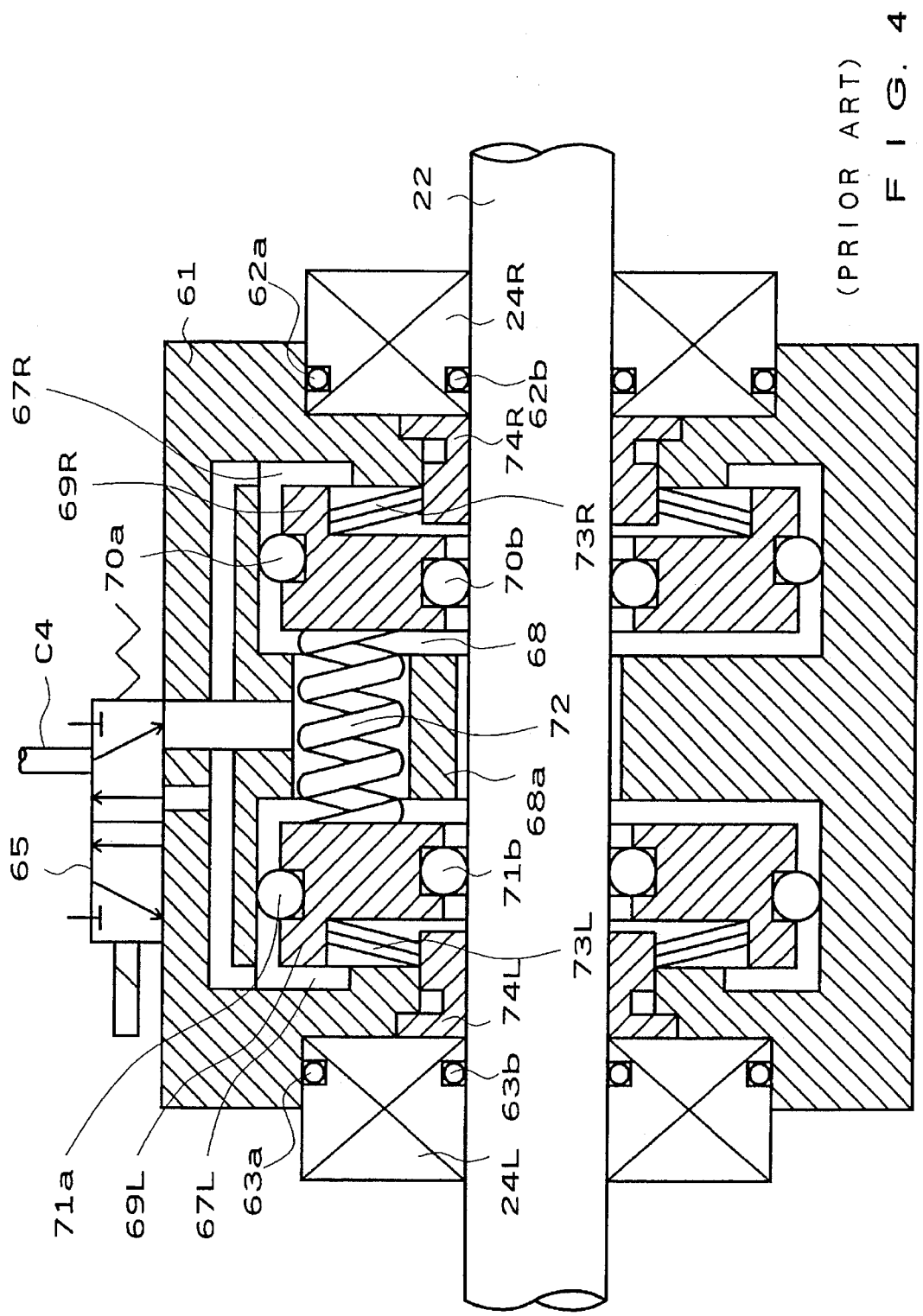
FIG. 4 is a sectional view showing the general structure of a prior art braking apparatus.
Figures 5A, 5B, 5C:
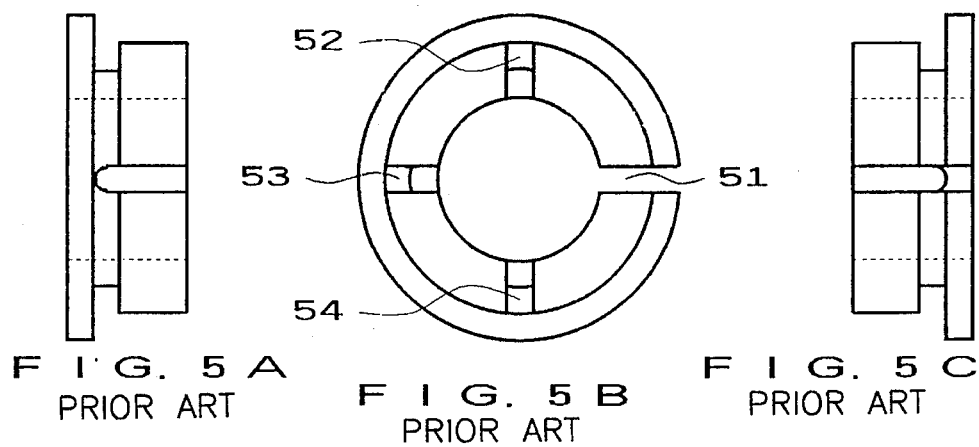
FIG. 5A is a left side view showing the shape of a brake bush employed in the prior art brake apparatus shown in FIG. 4.
FIG. 5B is a top plan view of the brake bush of FIG. 5A.
FIG. 5C is a right side view of the brake bush of FIG. 5A.
Figures 6A, 6B:
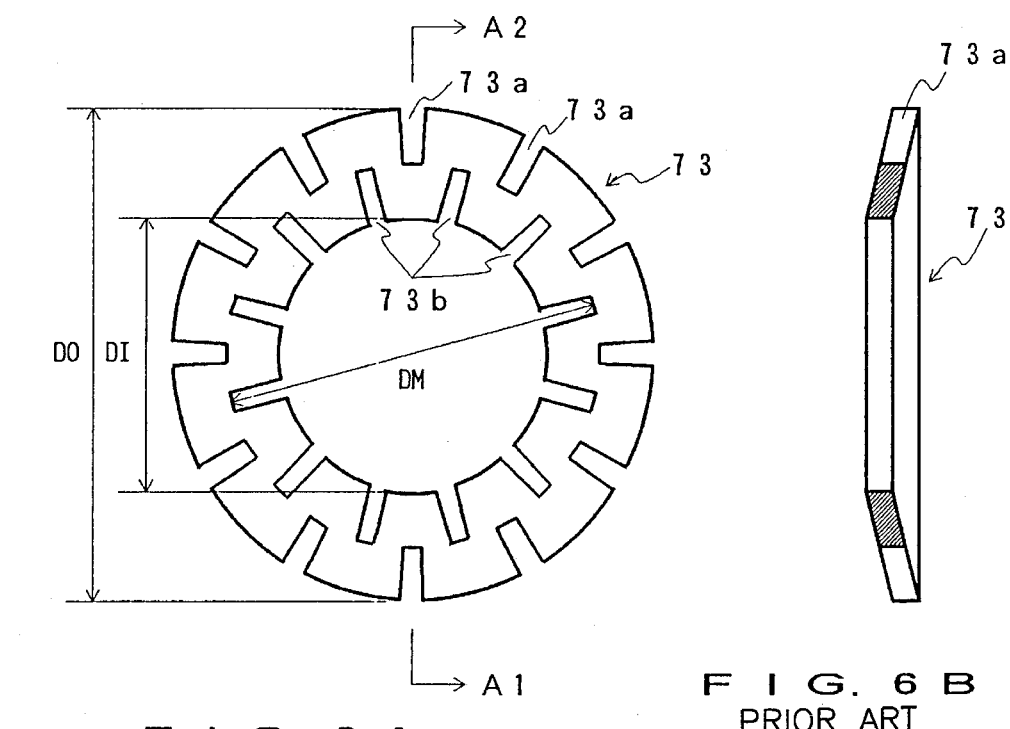
FIG. 6A is a top plan view showing the shape of a coned spring employed in the prior art braking apparatus.
FIG. 6B is a sectional view take along line A1–A2 of FIG. 6A.

FIG. 1 is a sectional view showing the general structure of a braking apparatus in accordance with a preferred embodiment of the invention. This braking apparatus is composed of a full pneumatic brake mechanism that is substantially similar to that employed in the prior art braking apparatus shown in FIG. 4. Namely, in the braking apparatus of the embodiment, compressed air is allowed to act within the apparatus in response to the ON/OFF control of an electromagnetic valve 65, so as to control the activation/deactivation of the braking function. General description on the braking apparatus will be given below with reference to FIG. 1, in which elements similar to those in FIG. 4 are denoted by the same reference characters as in FIG. 4 and will not be described in detail to avoid unnecessary duplication. FIGS. 2A and 2B show a specific configuration of coned disk spring 3 forming coned spring sections 3L, 3R of FIG. 1.

The braking apparatus of FIG. 1 is different from the prior art braking apparatus of FIG. 4 in that each of coned disk spring sections 3L, 3R comprises five coned disk springs and that each of the coned disk springs 3 has a rectangular sectional shape.

In this embodiment, so as to provide an axial spring constant equivalent to that provided by the prior art braking apparatus employing only two coned disk springs 73, each of the coned disk spring 3 is formed in such a manner that the maximum radial distance Dm between each opposed pair of inner radial recesses 3b is greater than the corresponding distance DM of the prior coned disk spring 73, as shown in FIG. 2A. To be more specific, as clearly shown in FIGS. 2A and 2B, each of the coned disk springs 3 has a plurality of outer radial recesses 3a extending from the outer peripheral edge thereof and spaced apart from each other at equal angular intervals, and also a plurality of inner radial recesses 3b extending from the inner peripheral edge thereof and spaced apart from each other at equal angular intervals. The outer and inner radial recesses 3a, 3b are arranged in an alternating fashion along the circumference of the coned disk spring 3. Further, the inner radial recess 3b has a radial length longer than that of the outer radial recess 3a, i.e., its radial outward end 3b' is located far beyond the radial inward end 3a' of each adjacent outer radial recess 3a'.

This arrangement of the coned disk spring 3 makes it possible to reduce the axial spring constant without the need for changing the wall thickness of the spring 3 itself, and therefore this embodiment can employ at least three or more, namely five coned disk springs 3 provided around the outer peripheral surface of the brake bush 74L or 74R. By thus increasing the number of the coned disk springs 3 employed, each of the springs will have less abrasion and, as a whole, durability of the braking apparatus can be highly enhanced.

Figures 3A, 3B:
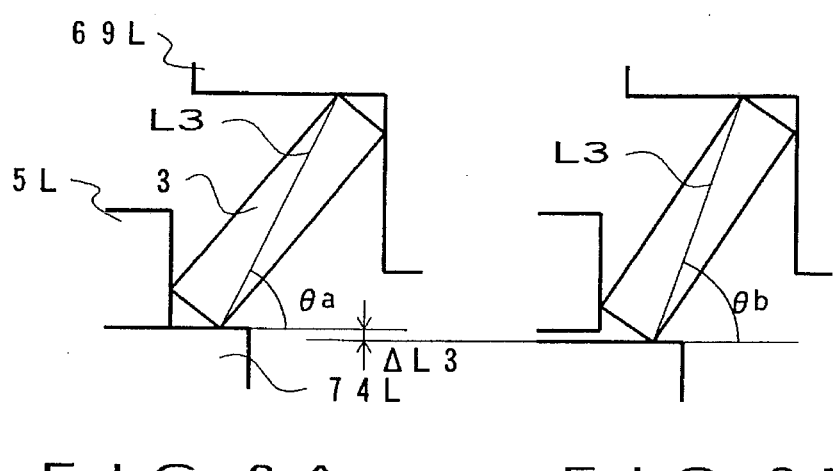
FIG. 3A is an expanded sectional view showing the relation between the coned spring, brake piston and brake bush when the braking apparatus of the invention is in the non-braking state.
FIG. 3B is an expanded sectional view similar to FIG. 3A, showing the relation between the coned spring, brake piston and brake bush when the braking apparatus of the invention is in the braking state.
Figures 7A, 7B, 7C, 7D:
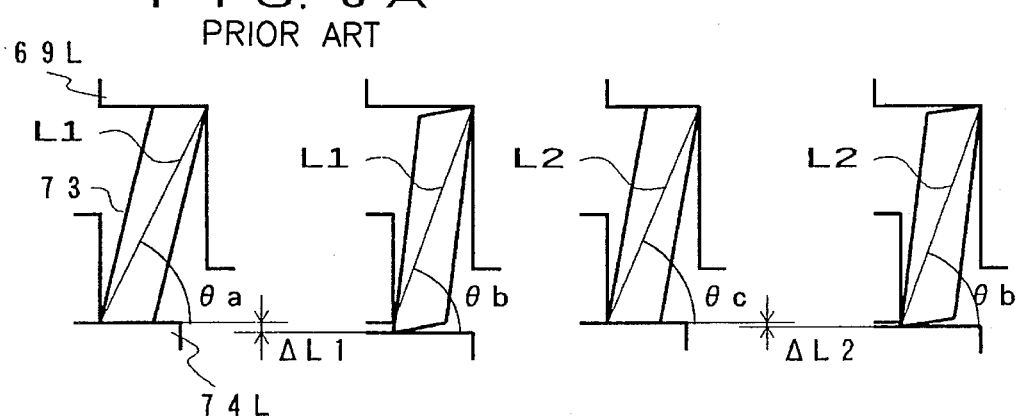
FIG. 7A is an expanded sectional view showing the relation between the coned spring, brake piston and brake bush when the prior art braking apparatus is in the non-braking state.
FIG. 7B is an expanded sectional view similar to FIG. 7A, showing the relation between the coned spring, brake piston and brake bush when the prior art braking apparatus is in the braking state.
FIG. 7C is an expanded sectional view similar to FIG. 7A, showing the coned spring in the non-braking state which has been abraded to a considerable degree.
FIG. 7D is an expanded sectional view similar to FIG. 7B, showing the coned spring in the braking state which has been abraded to a considerable degree.

As clearly seen from FIG. 2B, each of the coned disk springs 3 employed in the embodiment also has a substantially rectangular sectional shape as viewed along line B1–B2. As shown in FIG. 3A, the diagonal line L3 of the coned disk spring in the braking state forms angle θa with respect to the brake bush, which is the same angle as obtained in the prior art braking apparatus (See FIG. 7A). Further, as shown in FIG. 3B, the diagonal line L3 of the coned disk spring in the non-braking state forms angle θb which is the same angle as obtained in the prior art braking apparatus (See FIG. 7B). Therefore, the brake bush is pressed against the rod with a force ΔL3 (=(sin θb–sin θa) which is the same as the force ΔL1 in the prior art braking apparatus.

As the coned disk spring of the embodiment having the rectangular sectional shape performs its braking action up to millions of times, the outer and inner peripheral edges of the spring are gradually abraded in such a manner that the initial rectangular sectional shape gradually turns to a parallelogrammatic shape corresponding to the shape of the prior coned disk spring 73 shown in FIG. 7, with the diagonal line L3 in the rectangular sectional shape of the spring 3 being substantially reduced in length or shortened. This means that the coned disk spring 3 exhibits the parallelogrammatic sectional shape for the first time only after the braking action has been performed millions of times, and therefore that the spring can perform its braking action another millions of times.

Further, in the braking apparatus according to the embodiment, because five coned disk springs 3 are employed in each of the spring sections 3L, 3R, a cylindrical hole defined in each of the brake pistons 69L, 69R for receiving the corresponding springs 3 has an increased axial length as compared to that of the prior art braking apparatus, and the portion of each of the brake bushes 74L, 74R which contacts the inner peripheral edge of the corresponding coned disk springs also has an increased axial length.

Further, although the brake bushes 74L, 74R are held directly by the cylindrical casing 61 in the prior art braking apparatus, in the present embodiment, the brake bushes 74L, 74R are held by the casing 61 via the spacer members 5L, 5R. The spacer members 5L, 5R are displaceable in the radial direction because they are in contact with the casing 61 via unillustrated rubber packing members. Namely, because the brake bushes 74L, 74R in the prior art braking apparatus are caused to move with the axial movement of the casing 61, they would be excessively abraded as by contacting the rod 22 even when the braking apparatus is in the non-braking state, due to deviation from circularity and misalignment resultant from machining errors. In contrast, in the present embodiment, because the brake bushes 74L, 74R are held via the spacer members 5L, 5R so as to displace in the radial direction as the casing 61 moves in the axial direction, the bushes 74L, 74R will not contact the rod 22 and hence excessive abrasion of the bushes can effectively be avoided. This can also greatly enhance durability of the braking apparatus.

As described above, the embodiment is characterized by the features of the coned disk springs that the spring constant of each coned disk spring 3 is reduced as compared to the prior coned disk spring 73 and hence the number of the coned disk springs is increased, and each coned disk spring 3 is formed in a rectangular sectional shape. But, it should be understood that durability of the braking apparatus can also be enhanced by employing only one of the features.

Further, although each coned disk spring 3 has been described as having a rectangular sectional shape, the spring may be formed to be rectangular only in the inner peripheral portion, because, in most cases, it is only the inner peripheral edge that is actually abraded during the braking action. The reason why the inner peripheral edge of the coned disk spring 3 is abraded more than the outer peripheral edge is that the outer peripheral edge has a circumference about twice as long as that of the inner peripheral edge.

Moreover, the inner peripheral edge of each coned disk spring 3 may be greater in wall thickness than the outer peripheral edge and may alternatively have a trapezoidal sectional shape. By employing such a trapezoidal sectional shape, the outer peripheral edge of each coned disk spring 3 can be smaller in wall thickness so as to provided a reduced spring constant, and hence it is allowed to increase the number of the springs employed. Besides, because the inner peripheral edge of each coned disk spring 3 has a greater wall thickness, durability against abrasion can be enhanced.

According to the present invention as has been so far described, abrasion of each coned disk spring can be minimized and durability of the braking apparatus can be greatly enhanced. In addition, a sufficient braking force can be provided by the apparatus even when the outer and inner peripheral edges of coned disk springs have been abraded to a considerable degree.

What is claimed is:

1. A braking apparatus comprising:

a substantially columnar rod;

a brake bush having a cylindrical shape and provided around said rod, said brake brush being capable of moving relative to said rod axially along an outer surface of said rod and also causing a frictional braking force between said brake bush and said rod by being pressed radially inwardly against said rod;

coned disk springs each being bottomless-dish shaped and also having outer and inner radial recesses extending radially from outer and inner peripheral edges thereof, respectively, said outer and inner recesses being arranged in an alternating fashion along a circumference of said spring, said coned disk springs being provided in such a manner that the inner peripheral edge of each of said springs contacts an outer peripheral surface of said brake bush;

a brake piston having an inner surface defining a cylindrical hole for providing therein said coned disk springs in such a manner that the outer peripheral edge of each of said springs contacts the inner peripheral surface of said brake piston, said brake piston being capable of moving relative to said rod axially along the outer surface of the rod to axially press said coned disk springs so that each of said springs is axially deformed into a flatter disk shape with the inner peripheral edge thereof compressed radially inwardly, to thereby press said brake bush radially inwardly against said rod;

a cylinder block capable of moving relative to said rod axially along the outer surface of the rod with said coned disk springs and brake piston held by said cylinder block and also allowing compressed air supplied from outside to act on said brake piston so that said brake piston is allowed to move axially along an inner surface of said cylinder block; and a holding member for holding said brake bush in such a manner that said brake bush is displaceable in a radial direction toward and away from said rod within said cylinder block, wherein each of said inner radial recesses in each of said springs has an increased radial length relative to a radial length of each of said outer radial recesses in each of said springs so as to achieve a reduced axial spring constant without changing a wall thickness of said spring, and that at least three or more said coned disk springs are provided around said brake bush so as to obtain a predetermined total spring constant.

2. A braking apparatus as defined in claim 1 wherein each of said coned disk springs has a rectangular sectional shape.

3. A braking apparatus as defined in claim 1 wherein each of said inner radial recesses has a radial length such that a radial outward end thereof is located far beyond a radial inward end of each adjacent one of said outer radial recesses.

* * * * *